(12) United States Patent
Ma et al.

(10) Patent No.: US 8,781,131 B2
(45) Date of Patent: Jul. 15, 2014

(54) KEY DISTRIBUTION METHOD AND SYSTEM

(75) Inventors: Jingwang Ma, Shenzhen (CN); Qian Jia, Shenzhen (CN); Wantao Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 385 days.

(21) Appl. No.: 13/125,872

(22) PCT Filed: Aug. 12, 2009

(86) PCT No.: PCT/CN2009/073214
§ 371 (c)(1),
(2), (4) Date: Jul. 8, 2011

(87) PCT Pub. No.: WO2010/045817
PCT Pub. Date: Apr. 29, 2010

(65) Prior Publication Data
US 2011/0255696 A1     Oct. 20, 2011

(30) Foreign Application Priority Data
Oct. 23, 2008   (CN) .......................... 2008 1 0172970

(51) Int. Cl.
*G06F 21/00* (2013.01)
*H04L 9/08* (2006.01)

(52) U.S. Cl.
CPC ........... *H04L 9/083* (2013.01); *H04L 2209/805* (2013.01); *H04L 2209/56* (2013.01)
USPC ....................................................... 380/279

(58) Field of Classification Search
CPC ................................ H04L 9/08; H04L 63/062
See application file for complete search history.

(56) References Cited

U.S. PATENT DOCUMENTS

| | | | |
|---|---|---|---|
| 6,005,942 A * | 12/1999 | Chan et al. ...................... | 713/187 |
| 6,233,683 B1 * | 5/2001 | Chan et al. ...................... | 713/172 |
| 2008/0005567 A1 * | 1/2008 | Johnson ......................... | 713/172 |

| | | | |
|---|---|---|---|
| 2009/0235352 A1 | 9/2009 | Schrijen et al. | |

FOREIGN PATENT DOCUMENTS

| | | |
|---|---|---|
| CN | 101073098 A | 11/2007 |
| KR | 10-0806186 B1 | 2/2008 |

(Continued)

OTHER PUBLICATIONS

GlobalPlatform—The Standard fro Smart Card Infrastructure, Card Specification, Version 2.2, Mar. 2006, 375 pages.*

(Continued)

*Primary Examiner* — William Goodchild
(74) *Attorney, Agent, or Firm* — Scully, Scott, Murphy & Presser, P.C.

(57) ABSTRACT

The present invention discloses a key distribution method and system, and the method includes: a card issuer management platform generating initial keys of a supplementary security domain corresponding to an application provider, importing the initial keys and a Trust Point's public key for external authentication to the supplementary security domain, and sending the information of the supplementary security domain and the initial keys to the application provider management platform (202); the application provider management platform receiving the information of the supplementary security domain and the initial keys, and selecting the supplementary security domain of the smart card by a service terminal according to the information of the supplementary security domain and the initial keys (204); the application provider management platform generating a public key and a private key of the supplementary security domain as well as a certificate of the supplementary security domain, and encrypting the public key and the private key as well as the certificate of the supplementary security domain and then sending them to the supplementary security domain (206). Through the above processing, the security of the key distribution for the supplementary security domain can be improved.

6 Claims, 3 Drawing Sheets

(56) References Cited

FOREIGN PATENT DOCUMENTS

WO 98/43212 A1 10/1998
WO 00/25278 A1 5/2000

OTHER PUBLICATIONS

International Search Report dated Nov. 19, 2009, issued in corresponding International Application No. PCT/CN2009/073214.

* cited by examiner

KEY DISTRIBUTION METHOD AND SYSTEM

FILED OF THE INVENTION

The present invention relates to communication field, in particular to a key distribution method and system.

BACKGROUND OF THE INVENTION

In the related art, Near Field Communication (NFC) is a short-distance wireless communication technology working in 13.56 MHz, evolving from convergence of Radio Frequency Identification (RFID) technology and interconnection technology. A mobile communication terminal such as a mobile phone can achieve the simulation of non-contact IC card by integrating NFC technology for the applications to the field related to electronic payment. Further, the realization of the solution on a mobile communication terminal requires addition of NFC analog front-end chip and NFC antenna on the terminal, and use of smart card which supports electronic payment.

With development of more than ten years, IC card, especially a non-contact IC card, has been widely used in the fields such as public transport, access control, and electronic micropayment. Meanwhile, after rapid development of more than twenty years, mobile phones are popularized, and bring forth great convenience to people's work and life. Thus, equipping mobile phones with the non-contact IC card technology and using mobile phones in the electronic payment field will expand the application field of mobile phones, and brings more convenience to people's life. Thus, the prospect of the application of mobile phones is very promising.

In the related art, in order to achieve mobile electronic payment based on the NFC technology, it is required to establish a mobile terminal electronic payment system, and to realize management on mobile terminal electronic payment through the system, wherein the mobile terminal electronic payment system includes: issuance of a smart card, download, installation, and individuation of electronic payment application, and use of related art and management strategies to achieve the security of electronic payment.

Security domains are representatives of off-card entities including card issuers and application providers on a card, and include cryptographic keys supporting operation of Secure Channel Protocol and card content management. The security domains are responsible for their own key management, which ensures the coexistence of application and data from different application providers on the same card. When a key of a security domain uses non-symmetric key system, the keys and the certificate in the security domain need to include: a public key and a private key of the security domain, a certificate of the security domain, and a Trust Point's public key for verifying certificates of off-card entities.

The security domain of an application provider on the smart card is a supplementary security domain. Before the electronic payment application of the application provider is downloaded to be installed to a smart card, it is required to firstly use an issuer security domain of the smart card owned by a card issuer to create a supplementary security domain of the application provider, and then set a key for the supplementary security domain.

Since the key of a security domain is confidential data, reliable and safe methods and technologies need to be used to import the related key and certificate into a supplementary security domain, to achieve safe distribution of key in the supplementary security domain, wherein, the establishment of the supplementary security domain needs to be established by a issuer security domain of a smart card with an instruction from a card issuer management platform, and after the supplementary security domain has been created, the initial keys of the supplementary security domain can be set and distributed by the card issuer management platform.

After the supplementary security domain has been created, the card issuer management platform can inform a application provider management platform of generating a public/private key pair and a certificate of the supplementary security domain; and after the application provider management platform generates the public/private key pair and the certificate of the supplementary security domain, the card issuer management platform transmits the public/private key pair and the certificate of the supplementary security domain to the supplementary security domain through the issuer security domain of the smart card, thereby, the key distribution of the supplementary security domain is completed.

In these circumstances, the card issuer management platform can obtain the transmitted key data of the security domain when it is in charge of the transmission of the key data, and may perform operations on the supplementary security domain using the obtained key, which will threat the security of electronic payment application of the application provider. Therefore, there is an urgent need for a technical solution to solve the problem of insecurity in key distribution of the supplementary security domain.

SUMMARY OF THE INVENTION

The present invention is provided in view of the problem of insecurity in key distribution of the supplementary security domain caused by the card issuer management platform can obtain the transmitted key data of the security domain when it in charge of the transmission of the key data in the related art. Thus, the main object of the present invention is to provide a key distribution method and system to solve the problem existing in the related art as mentioned above.

According to one aspect of the present invention, a key distribution method is provided.

The key distribution method according to the present invention comprises: a card issuer management platform generating initial keys of a supplementary security domain corresponding to an application provider, importing the initial keys and a Trust Point's public key for external authentication to the supplementary security domain, and sending information of the supplementary security domain and the initial keys to an application provider management platform; the application provider management platform receiving the information of the supplementary security domain and the initial keys, and selecting the supplementary security domain of a smart card by a service terminal according to the information of the supplementary security domain and the initial keys; the application provider management platform generating a public key and a private key of the supplementary security domain as well as a certificate of the supplementary security domain, and encrypting the public key and the private key as well as the certificate of the supplementary security domain and then sending them to the supplementary security domain.

The processing of the card issuer management platform generating initial keys particularly comprises: the application provider management platform judging, through the service terminal, whether a supplementary security domain corresponding to the application provider exists in the smart card; if it is determined to be yes, the supplementary security domain of the application provider has existed in the smart card, and security domain creation and key distribution no longer being performed; if no, the application provider management platform creating, through the card issuer management platform, the supplementary security domain in the smart card, and the card issuer management platform generating the initial keys.

The processing of the application provider management platform creating the supplementary security domain in the smart card through the card issuer management platform particularly comprises: the card issuer management platform communicating with the smart card through the application provider management platform, selecting a issuer security domain of the smart card and establishing a secure channel with the issuer security domain; the card issuer management platform informing, through the secure channel, the issuer security domain of creating the supplementary security domain corresponding to the application provider; the issuer security domain creating the supplementary security domain in the smart card.

After the application provider management platform receives the information of the supplementary security domain and the initial keys sending by the card issuer management platform, the method further comprises: the application provider management platform records in its database the supplementary security domain information.

After the application provider management platform selects the supplementary security domain of the smart card by the service terminal according to the information of the supplementary security domain and the initial keys, the method further comprises: the application provider management platform establishes a secure channel with the supplementary security domain.

Further, after the application provider management platform encrypting the public key and the private key as well as the supplementary security domain certificate and then sending them to the supplementary security domain, the method further comprises: the supplementary security domain updates the initial keys to the public key and the private key, and writes the supplementary security domain certificate into the supplementary security domain.

According to another aspect of the present invention, a key distribution system is provided.

The key distribution system according to the present invention comprises: a card issuer management platform which comprises: a generating module, configured to generate initial keys of a supplementary security domain corresponding to an application provider; an importing module, configured to import the initial keys and a Trust Point's public key for external authentication to the supplementary security domain; a first transmitting module, configured to transmit information of the supplementary security domain and the initial keys to an application provider management platform; the application provider management platform which comprises: a receiving module, configured to receive the information of the supplementary security domain and the initial keys of the card issuer management platform; a selecting module, configured to select the supplementary security domain of the smart card by a service terminal according to the information of the supplementary security domain and the initial keys; a generating module, configured to generate a public key and a private key of the supplementary security domain and a supplementary security domain certificate; a second transmitting module, configured to encrypt the public key and the private key as well as the supplementary security domain certificate, and then transmit them to the supplementary security domain, to complete the supplementary security domain key distribution; the service terminal, configured to establish communications with the smart card through a reading and writing device, and to establish a connection between the smart card and the application provider management platform; the smart card, located in a mobile terminal, and comprising the supplementary security domain, wherein the supplementary security domain being set according to the initial keys and the Trust Point's public key sent by the application provider management platform, and being set according to the public key and the private key as well as the supplementary security domain certificate sent by the application provider management platform, and installing the supplementary security domain certificate.

The application provider management platform further includes: a judging module, configured to judge, through the service terminal, whether there is a supplementary security domain corresponding to the application provider in the smart card; a creating module, configured to create the supplementary security domain in the smart card through the card issuer management platform if the judging module judges that there is a lack of the supplementary security domain corresponding to the application provider in the smart card.

The application provider management platform further includes: a recording module, configured to record in its database the information of the supplementary security domain after receiving the information of the supplementary security domain and the initial keys sent by the card issuer management platform.

The application provider management platform further includes: a secure channel establishing module, configured to establish a secure channel with the supplementary security domain after selecting the supplementary security domain of the smart card through the service terminal according to the information of the supplementary security domain and the initial keys.

By means of the technical solution of the present invention, the supplementary security domain keys are distributed through the service terminal of the application provider, which solves the problem of insecurity in key distribution of the supplementary security domain caused by that the card issuer management platform can obtain the transmitted key data of the security domain when in charge of the transmission of the key data in the related art, can avoid other possible security threats and attack, and thereby, enhances security in supplementary security domain key distribution of the application provider.

Other features and advantages of the present invention will be set forth in the following description, and, partially become obvious in the Description, or be understood through the embodiments of the present invention. The object of the present invention and other advantages could be achieved and obtained through the structure specified in the Description, the Claims, and the accompanying drawings.

BRIEF DESCRIPTION OF THE
ACCOMPANYING DRAWINGS

The drawings herein are used to provide further understanding of the present invention and form a part of the specification, which are used to explain the present invention with embodiments of the present invention rather than unduly limit the present invention. In the accompanying drawings.

DETAILED DESCRIPTION OF THE PREFERRED EMBODIMENTS

Function Overview

In the related art, the card issuer management platform can obtain the transmitted key data of the security domain when in charge of the transmission of the key data, which can result in insecurity in key distribution of the supplementary security domain of the application provider. Thus, the present invention provides a key distribution method and system, particularly includes: a card issuer management platform generates initial keys of a supplementary security domain corresponding to an application provider, imports the initial keys and a Trust Point's public key for external authentication to the supplementary security domain, and sends the information of the supplementary security domain and the initial keys to the application provider management platform; the application provider management platform receives the information of the supplementary security domain and the initial keys, and selects the supplementary security domain of the smart card by a service terminal according to the information of the supplementary security domain and the initial keys; the application provider management platform generates a public key and a private key of the supplementary security domain as well as a certificate of the supplementary security domain, and encrypts the public key and the private key as well as the certificate of the supplementary security domain and then sends them to the supplementary security domain.

Preferable embodiments of the present invention will be described hereinafter in conjunction with the accompanying drawings, and it shall be understood that the preferable embodiments herein are just used to describe and explain the present invention and shall not be construed as limitations on the present invention.

System Embodiments

Figure 1:
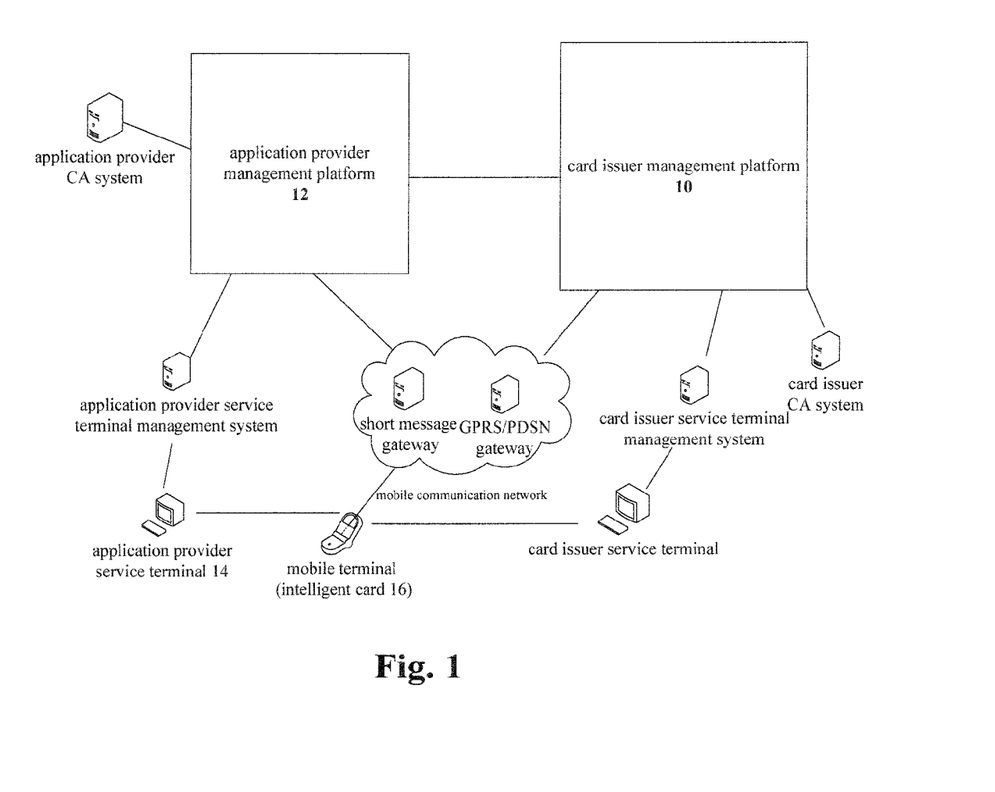
FIG. 1 is a block diagram of the key distribution system according to an embodiment of the present invention.

According to an embodiment of the present invention, a key distribution system is provided. FIG. 1 is a block diagram of the key distribution system according to an embodiment of the present invention. At present, a mobile terminal short-distance electronic payment system employs a multi-application framework of Global Platform specification as a service framework, multiple applications can be installed on a smart card supporting Global Platform specification, and the smart card is separated into a number of independent security domains, so as to ensure isolation and independence between the multiple applications. Each application provider manages its own security domain, application, application data, and so on. The smart card supporting Global Platform specification mentioned above indicates an IC chip or smart card in accordance with Global Platform Card Specification V2.1.1 or V2.2 set by Global Platform (GP) organization, and, in physical form, can be a SIM/USIM card, a pluggable intelligent memory card, or an IC chip integrated on the mobile terminal.

The framework of the mobile terminal electronic payment system based on Near Field Communication is required to meet the Global Platform Card Specification V2.1.1/V2.2 specification. If the system supports GP2.1.1 specification, the Security Channel Protocol needs to be based on symmetric key (Security Channel Protocol 02, referred to as SCP02); and if the system supports GP2.2 specification, the Security Channel Protocol needs to support SCP02 and be based on asymmetric key (Security Channel Protocol 10, referred to as SCP10). Moreover, card issuers and application providers can make a selection according to the requirements of the security strategies.

In terms of service architecture, the mobile terminal short-distance payment system can include card issuers, application providers, and users, wherein:

card issuer: responsible for card issuance and management, with a card management system, a key management system, and a certificate management system, wherein the certificate management system is used only under the condition of supporting asymmetric key. In addition, the card issuer manages the resources, life cycle, key, and certificate of the card, creates security domains of other application providers, and interacts with other security domains in application data. The card issuer can also have an application management system responsible for provision and management functions of the applications of the card issuer or of the applications hosted by the card issuer. The card issuer can have a service terminal management system and a service terminal, and provide services to users through the service terminal. To support the management on the application provider, the card issuer can have an application provider management system to record information concerning the application provider, and to define service authorities of the application provider through the system.

Application provider: responsible for the provision and management functions of the electronic payment applications, with an application management system, a key management system, and a certificate management system, wherein the certificate management system is used only under the condition of supporting asymmetric key. In addition, the application provider provides a variety of service applications, manages the security domain corresponding to the application provider on the card, controls the application key, certificate, and data of the security domain, and provides secure download function of the applications. The application providers can be operators, banks, bus companies, retailers, and so on. In addition, the application provider can have a service terminal management system and a service terminal, and provide services to users through the service terminal.

User: responsible for download, installation and use of electronic payment applications. Through the interaction with the card issuer or the application provider, the user operates the mobile terminal and the card, downloads and installs new applications in security domains, and uses various service applications provided by the application provider or the card issuer.

The mobile terminal electronic payment system mainly consists of a card issuer management platform, an application provider management platform, and a mobile terminal. The system can have multiple application provider management platforms.

The mobile terminal has a smart card supporting electronic payment. In order to realize security management of the smart card and download and installation of payment application, the smart card needs to establish communications with the card issuer management platform and the application provider management platform, and connections between the smart card and the management platforms can be realized through the service terminals of the management platforms. The service terminals are equipped with a non-contact card reader or a card reader directly reading the smart card. Moreover, the service terminals can establish communications with the management platforms, so as to realize communications between the smart card and the management platforms.

The mobile terminal electronic payment system based on Near Field Communication technology supports multiple electronic payment applications, that is, multiple electronic payment applications can be installed on the smart card. In order to realize the security of payment applications, the smart card uses Global Platform Card Specification V2.1/V2.2 specification, and the smart card is separated into a number of independent security domains, so as to ensure isolation and independence between the multiple applications. Each application provider manages its own security domain, application, application data, and so on.

Following, based on the above mentioned system architecture, the key distribution system for the supplementary security domain key distribution through the service terminal is described in detail. It can be explained that the key distribution system of the present invention is part of the mobile terminal electronic payment system based on Near Field Communication.

According to an embodiment of the present invention, a key distribution system is provided. FIG. 1 is a block diagram of the key distribution system according to an embodiment of the present invention. As showed in FIG. 1, the key distribution system comprises a card issuer management platform 10, an application provider management platform 12, a service terminal of an application provider 14, a smart card 16 (the smart card 16 is located within the mobile terminal, the smart card 16 includes issuer security domains and supplementary security domains), wherein the application provider needs to have a service terminal management system and the service terminal 14, and can provide services concerning electronic payment through the service terminal 14. The application provider management platform 12 and the card issuer management platform 10 are connected through dedicated line or Internet. The card issuer management platform 10 can establish communications with the smart card 16 through the application provider management platform 12 and the application provider service terminal 14. Moreover, the smart card 16 establishes connections with the application provider management platform 12 and the card issuer management platform 10 through the application provider service terminal 14. The key distribution system is explained in detail as follows.

The card issuer management platform 10 includes: a generating module, configured to generate initial keys of a supplementary security domain corresponding to an application provider; an importing module, configured to import the initial keys and a Trust Point's public key for external authentication (the Trust Point's public key is provided by CA which issues the application provider certificate, and can be obtained from the application provider management platform, the public key is used in the supplementary security domain for authenticating the application provider certificate) into the supplementary security domain; and a first transmitting module, configured to transmit the supplementary security domain information and the initial keys to the application provider management platform 12, wherein, combined the card issuer management platform 10 shown in FIG. 1, one or more of the generating module, the importing module, and the first transmitting module can be set in a subsystem of the card issuer management platform 10 according to practical application needs.

The application provider management platform 12 includes: a receiving module, configured to receive the information of the supplementary security domain and the initial keys of the card issuer management platform 10; a selecting module, configured to select the supplementary security domain of the smart card 16 by the service terminal 14 according to the information of the supplementary security domain and the initial keys; a generating module, configured to generate a public key and a private key of the supplementary security domain and a supplementary security domain certificate; a second transmitting module, configured to encrypt the public key and the private key as well as the supplementary security domain certificate, and then transmit them to the supplementary security domain, to complete the supplementary security domain key distribution, wherein, combined the application provider management platform 12 shown in FIG. 1, one or more of the receiving module, the selecting module, the generating module, and the second transmitting module can be set in a subsystem of the application provider management platform 12 according to practical application needs.

Further, the application provider management platform 12 further includes: a judging module, configured to judge, through the service terminal 14, whether a supplementary security domain corresponding to the application provider exists in the smart card 16; a creating module, configured to create a supplementary security domain on the smart card 16 through the card issuer management platform 10, in cases the result of the judgement is that a supplementary security domain corresponding to the application provider does not exist in the smart card 16.

Further, the application provider management platform 12 further includes: a recording module, configured to record in its database the information of the supplementary security domain, after receiving the information of the supplementary security domain and the initial keys sent by the card issuer management platform 10.

Further, the application provider management platform 12 further includes: a secure channel establishing module, configured to establish a secure channel with the supplementary security domain after selecting the supplementary security domain of the smart card 16 through the service terminal 14 according to the information of the supplementary security domain and the initial keys.

The service terminal 14, configured to establish communications with the smart card 16 through a reading and writing device, and to establish a connection between the smart card 16 and the application provider management platform 12.

The smart card 16, located in a mobile terminal, and comprises the supplementary security domain, wherein the supplementary security domain is set according to the initial keys and the public key for trust point sent by the application provider management platform 12, and is set according to the public key and the private key as well as the supplementary security domain certificate sent by the application provider management platform 12, and installs the supplementary security domain certificate.

Through the above processing, after the card issuer management platform 10 returns the basic information and the keys of the supplementary security domain to the application provider management platform 12, the keys are redistributed between the application provider management platform 12 and the supplementary security domain. Herein, the communications between the application provider management platform 12 and the smart card 16 are no longer transmitted by the card issuer management platform 10, but by the service terminal 14 of the application provider, which realizes the isolation of the card issuer management platform 10, such that the card issuer management platform 10 can not obtain the supplementary security domain key created by the application provider supplementary security domain on the smart card 16. Further, the communications between the application provider management platform 12 and the smart card 16 are in a closed environment, so that the potential security threats and attacks can be avoided. The present invention can achieve secure key distribution for the supplementary security domain of the application provider.

Method Embodiments

Figure 2:
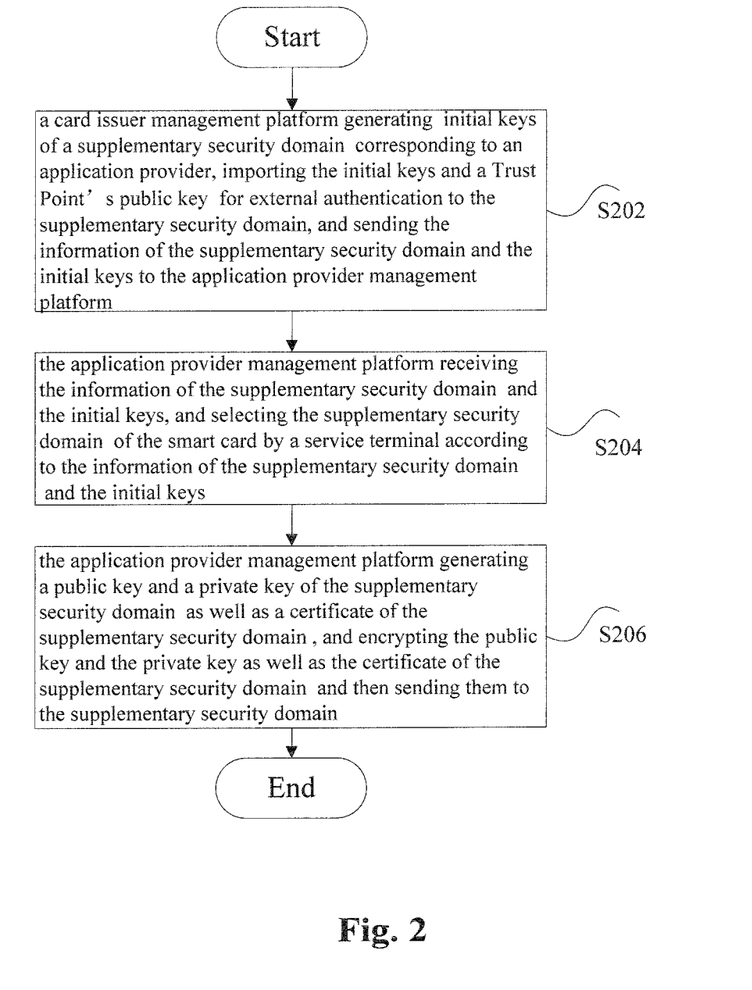
FIG. 2 is a flowchart of the key distribution method according to an embodiment of the present invention.

According to an embodiment of the present invention, a key distribution method is provided for key distribution to the supplementary security domains of the application provider. FIG. 2 is a flowchart of the key distribution method according to an embodiment of the present invention. As shown in FIG. 2, the following processing (step S202-step S206) are included:

step S202, a card issuer management platform generates initial keys of a supplementary security domain corresponding to an application provider, imports the initial keys and a root public key trust for external authentication to the supplementary security domain, and sends the supplementary security domain information and the initial keys to an application provider management platform, In the above, in step S202, before electronic payment application of the application provider is downloaded to the smart card through the service terminal of the application provider, the application provider management platform judges, through the service terminal, whether there is a supplementary security domain corresponding to the application provider in the smart card; if yes, it indicates that there is a security domain corresponding to the application provider in the smart card, and key distribution has been conducted in the security domain, and under this condition, supplementary security domain creation and key distribution are no longer needed, and the application provider management platform can download the electronic payment application to the existing supplementary security domain; if not, the application provider management platform creates, through the card issuer management platform, a supplementary security domain in the smart card, and the card issuer management platform generates initial keys In the above, the specific processing of the application provider management platform creating a supplementary security domain in the smart card through the card issuer management platform is: the card issuer management platform communicates with the smart card through the application provider management platform, selects the issuer security domain of the smart card and establish a secure channel with the issuer security domain; the card issuer management platform informs, through the secure channel, the issuer security domain of establishing a supplementary security domain corresponding to the application provider; the issuer security domain creates a supplementary security domain in the smart card.

Step S204, the application provider management platform receives the information of the supplementary security domain and the initial keys, and selects the supplementary security domain of a smart card through a service terminal according to the supplementary security domain information and the initial keys, In the above, in step S204, after the application provider management platform receives information of the supplementary security domain and the initial keys sent by the card issuer management platform, the application provider management platform records in its database the information of the supplementary security domain.

Further, in step S204, after the application provider management platform selects the supplementary security domain of the smart card through the service terminal according to the information of the supplementary security domain and the initial keys, the application provider management platform establishes a secure channel with the supplementary security domain.

Step S206, the application provider management platform generates a public key and a private key of the supplementary security domain as well as a supplementary security domain certificate, and sends the public key and the private key as well as the supplementary security domain certificate to the supplementary security domain after encrypting them.

In step S206, after the application provider management platform sends the public key and the private key as well as the supplementary security domain certificate to the supplementary security domain after encrypting them, the method further comprises: the supplementary security domain updates the initial keys to the public key and the private key, and writes the supplementary security domain certificate into the supplementary security domain.

Figure 3:
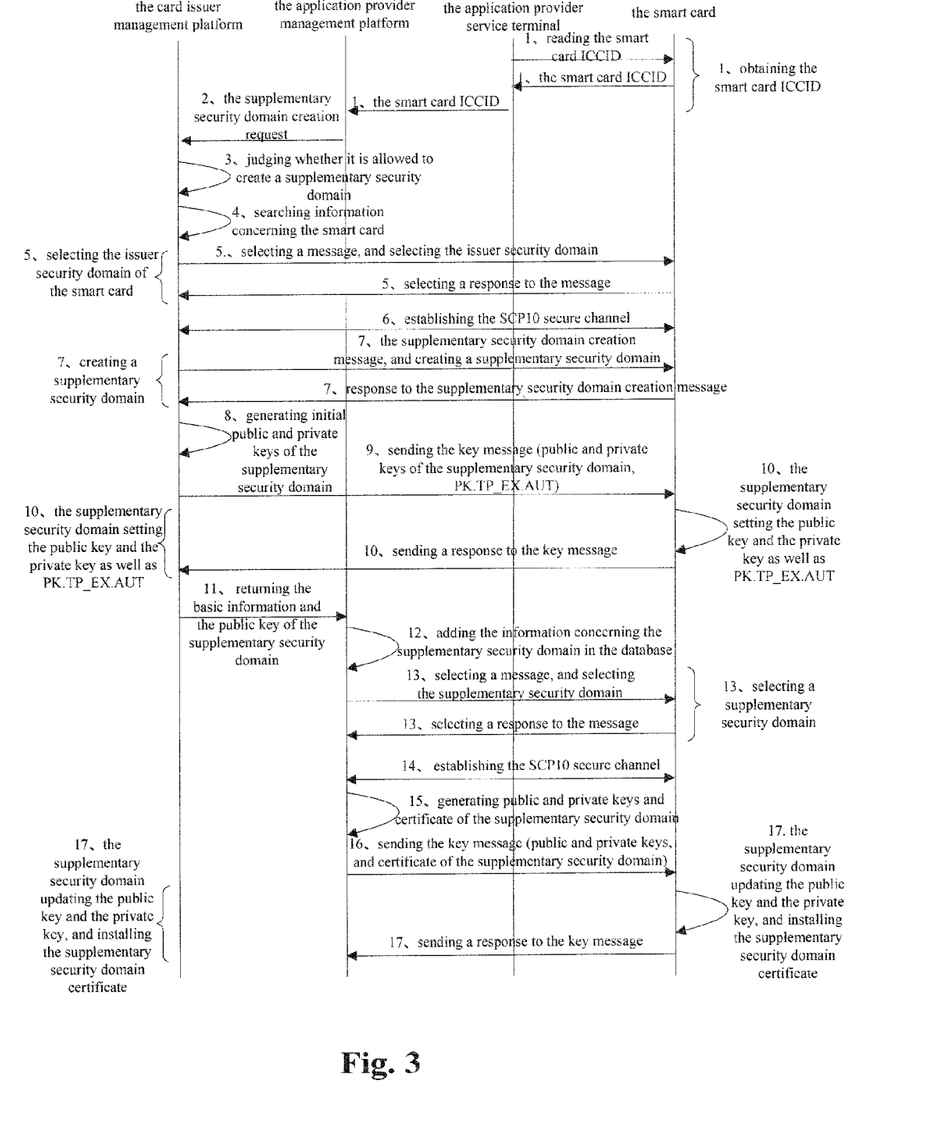
FIG. 3 is a signaling flowchart of the particular processing procedure of the key distribution method according to an embodiment of the present invention.

Following, the above technical solution of the present invention is described in detail in conjunction with embodiments. As shown in FIG. 3, FIG. 3 is a signaling flowchart of the specific processing procedure of the key distribution method according to an embodiment of the present invention. It can be explained that, although the following description is based on the example of mobile terminal electronic payment system architecture shown in FIG. 1, the application occasions of the present invention are not limited to the mobile terminal electronic payment system architecture illustrated in FIG. 1.

In this embodiment, the service terminal of the application provider can be either computer equipments at business locations of the application provider, or a terminal involved in processing of services such as electronic payment user information management, supplementary security domain creation, key update, electronic payment application download. Moreover, the terminal can be connected to the application provider management platform through a service terminal management system of the application provider, and the connection between the service terminal and the application provider management platform can be realized by dedicated line or Internet connections. Further, the service terminal is equipped with a non-contact card reader or a reading and writing device reading the smart card directly, and the service terminal can establish communications with the smart card through the reading and writing device.

In the embodiment, the application provider management platform is connected to the card issuer management platform through dedicate line or Internet, and the card issuer management platform can establish communications with the smart card through the application provider management platform and the application provider service terminal.

Moreover, the application and download of the electronic payment application service can be completed by the application provider service terminal. Before the electronic payment application is downloaded, it is required to check whether a supplementary security domain belonging to the application provider exists in the smart card, and the particular checking method is as follows:

1. reading feature information ICCID of the smart card through the service terminal, and then the application provider management platform searching in the database of the smart card, in which a supplementary security domain is created, of the system, whether a supplementary security domain of the application provider has been created in the smart card, according to ICCID;

2. when the supplementary security domains of the application provider in all the smart cards have the same ID, transmitting a selection message, viz. SELECT message, to the smart cards, the object parameter in the message being the supplementary security domain ID, if it is indicated in the response to the selection message, viz. SELECT RESPONSE, returned by a smart card, that the corresponding supplementary security domain does not exist, judging that there is no supplementary security domain of the application provider in the smart card.

Moreover, if the supplementary security domain of the application provider does not exist, it is required to perform supplementary security domain creation and the supplementary security domain key distribution first.

Following, the creation process of the supplementary security domain of the application provider and the key distribution process are described in conjunction with FIG. 3, the following processing includes:

1. the application provider service terminal reads identification information of the smart card, such as ICCID of the smart card, and then transmits the identification information of the smart card to the application provider management platform.

2. the application provider management platform transmits a supplementary security domain creation request to the card issuer management platform, the request message including the application provider ID (ASP_ID), identification information ICCID of the smart card and so on.

3. after receiving the supplementary security domain creation request, the card issuer management platform checks the supplementary security domain creation request, and determines whether the request is allowed, wherein the card issuer can determine whether a supplementary security domain is created through the application provider management platform, according to service authority of the application provider.

4. after confirming that a supplementary security domain can be created by the application provider management platform, the card issuer management platform searches information concerning the smart card, including ID (ISD_ID) of the issuer security domain of the smart card, in the database in the platform, according to ICCID of the smart card.

5. the card issuer management platform sends the selection message SELECT to the smart card through the application provider management platform to select the issuer security domain of the smart card.

6. the card issuer management platform and the issuer security domain of the smart card establishing SCP10 secure channel according to the requirements of Appendix F Secure Channel Protocol 10 of Global Platform Card Specification V2.2, to complete the authentication of both sides and the negotiation of session key.

7. the card issuer management platform sends a supplementary security domain creation message INSTALL [for Install] to the issuer security domain. The issuer security domain creates a supplementary security domain in accordance with the message, after the completing of the creation of the supplementary security domain, the issuer security domain sends an INSTALL Response to the card issuer management platform.

8. after receiving the supplementary security domain creation response and confirming that a supplementary security domain has been created, the card issuer management platform generates an initial public/private key pair of the supplementary security domain (corresponding to step S202 in FIG. 2).

9. the card issuer management platform sends the public key and the private key of the supplementary security domain and one Public Key for Trust Point for External Authentication (PK.TP_EX.AUT) to the issuer security domain of the smart card by sending a key message PUT KEY (corresponding to step S202 in FIG. 2).

10. the issuer security domain of the smart card sends the initial public key and the initial private key of the supplementary security domain as well as PK.TP_EX.AUT to the supplementary security domain, the supplementary security domain sets the initial public key and the initial private key as well as PK.TP_EX.AUT, and then sends a response to the key message, viz. PUT KEY RESPONSE, to the card issuer management platform (corresponding to step S202 in FIG. 2).

11. the card issuer management platform sends the basic information of the created supplementary security domain and the public/private key pair of the smart card to the application provider management platform (corresponding to step S202 in FIG. 2).

12. the application provider management platform adds in the database the information concerning the supplementary security domain.

13. the application provider management platform sends a selection message SELECT to the smart card by the application provider service terminal to select the supplementary security domain created by the card issuer management platform (corresponding to step S204 in FIG. 2).

14. the application provider management platform and the supplementary security domain establishes the SCP10 secure channel according to the requirements of Appendix F Secure Channel Protocol '10' of Global Platform Card Specification V2.2, to complete the authentication of the application provider management platform performed by the supplementary security domain and negotiation of session key (corresponding to step S204 in FIG. 2).

15. the application provider management platform generates a public key and a private key of the supplementary security domain, the certificate management system in the application provider management platform sends the public key of the supplementary security domain and certificate application information to the application provider CA, the CA issues the supplementary security domain certificate (corresponding to step S206 in FIG. 2);

16. the application provider management platform sending the public key and the private key as well as the certificate of the supplementary security domain to the supplementary security domain by sending a key message PUT KEY. In order to ensure security of the data, in the PUT KEY message, it is required to encrypt the public key and the private key as well as the certificate of the supplementary security domain using the session key (corresponding to step S206 in FIG. 2).

17. the supplementary security domain decrypts the message using a session key, and obtains the public/private key pair and the supplementary security domain certificate sent by the application provider management platform; the supplementary security domain updates the initial public and private keys generated by the card issuer management platform to the public key and the private key generated by the application provider management platform, and installs the supplementary security domain certificate.

After the above processing is performed, download and installation of electronic payment applications can be continued between the application provider management platform and the supplementary security domain.

According to an embodiment of the present invention, a computer readable medium is provided on which computer executable instructions are stored, wherein when the instructions are executed by a computer or processor, the computer or processor is made to perform processing of step S202 and step S206 as shown in FIG. 2, preferably, performing the above method embodiments and one or more of the embodiments.

All in all, by means of the technical solution of the present invention, the supplementary security domain key distribution is performed through the service terminal of the application provider, which solves the problem of insecurity in the supplementary security domain key distribution in the related art caused by that the card issuer management platform can obtain the transmitted key data of the security domain when in charge of the transmission of the key data, can avoid other possible security threats and attack, and thereby, enhances security in supplementary security domain key distribution of the application provider.

In addition, the present invention is carried out without modifications on the system architecture and the current processing procedures, so the present invention is easy to carry out and promote in technical field, and has strong industrial applicability.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of the claims of the present invention.

What is claimed is:

1. A key distribution method, comprising:
a card issuer management platform generating initial keys of a supplementary security domain corresponding to an application provider, importing the initial keys and a root public key trusted for external authentication to the supplementary security domain, and sending information of the supplementary security domain and the initial keys to an application provider management platform;
the application provider management platform receiving the information of the supplementary security domain and the initial keys, and selecting the supplementary security domain of an intelligent card by a service terminal according to the information of the supplementary security domain and the initial keys;
the application provider management platform generating a public key and a private key of the supplementary security domain as well as a certificate of the supplementary security domain, and encrypting the public key and the private key as well as the certificate of the supplementary security domain and then sending them to the supplementary security domain,
wherein the processing of the card issuer management platform generating initial keys comprises:
the application provider management platform judging, through the service terminal, whether a supplementary security domain corresponding to the application provider exists in the intelligent card;
if it is determined to be yes, the supplementary security domain of the application provider has existed in the intelligent card, and security domain creation and key distribution no longer being performed;
if no, the application provider management platform creating, through the card issuer management platform, the supplementary security domain in the intelligent card, and the card issuer management platform generating the initial keys,
wherein the processing of the application provider management platform creating the supplementary security domain in the intelligent card through the card issuer management platform comprises:

the card issuer management platform communicating with the intelligent card through the application provider management platform, selecting an issuer security domain of the intelligent card and establishing a secure channel with the issuer security domain;
the card issuer management platform informing, through the secure channel, the issuer security domain of creating the supplementary security domain corresponding to the application provider;
the issuer security domain creating the supplementary security domain in the intelligent card.

2. The method according to claim 1, wherein after the application provider management platform receiving the information of the supplementary security domain and the initial keys sending by the card issuer management platform, the method further comprises:
the application provider management platform recording in its database the information of the supplementary security domain.

3. The method according to claim 1, wherein after the application provider management platform selecting the supplementary security domain of the intelligent card by the service terminal according to the information of the supplementary security domain and the initial keys, the method further comprises:
the application provider management platform establishing a secure channel with the supplementary security domain.

4. The method according to claim 1, wherein after the application provider management platform encrypting the public key and the private key as well as the supplementary security domain certificate and then sending them to the supplementary security domain, the method further comprises:
the supplementary security domain updating the initial keys to the public key and the private key, and writing the supplementary security domain certificate into the supplementary security domain.

5. A key distribution system, comprising:
a card issuer management platform which comprises:
a generating module, configured to generate initial keys of a supplementary security domain corresponding to an application provider;
an importing module, configured to import the initial keys and a root public key trusted for external authentication to the supplementary security domain;
a first transmitting module, configured to transmit information of the supplementary security domain and the initial keys to an application provider management platform;
the application provider management platform which comprises:
a receiving module, configured to receive the information of the supplementary security domain and the initial keys of the card issuer management platform;
a selecting module, configured to select the supplementary security domain of the intelligent card by a service terminal according to the information of the supplementary security domain and the initial keys;
a generating module, configured to generate a public key and a private key of the supplementary security domain and a supplementary security domain certificate;
a second transmitting module, configured to encrypt the public key and the private key as well as the supplementary security domain certificate, and then transmit them to the supplementary security domain, to complete the supplementary security domain key distribution;

the service terminal, configured to establish communications with the intelligent card through a reading and writing device, and to establish a connection between the intelligent card and the application provider management platform;

the intelligent card, located in a mobile terminal, and comprising the supplementary security domain, wherein the supplementary security domain being set according to the initial keys and the root public key trusted sent by the application provider management platform, and being set according to the public key and the private key as well as the supplementary security domain certificate sent by the application provider management platform, and installing the supplementary security domain certificate, wherein the application provider management platform further includes:

a judging module, configured to judge, through the service terminal, whether there is a supplementary security domain corresponding to the application provider in the intelligent card;

a creating module, configured to create the supplementary security domain in the intelligent card through the card issuer management platform if the judging module judges that there is a lack of the supplementary security domain corresponding to the application provider in the intelligent card, wherein the application provider management platform further includes:

a secure channel establishing module, configured to establish a secure channel with the supplementary security domain after selecting the supplementary security domain of the intelligent card through the service terminal according to the information of the supplementary security domain and the initial keys.

6. The system according to claim 5, wherein the application provider management platform further includes:

a recording module, configured to record in its database the information of the supplementary security domain after receiving the information of the supplementary security domain and the initial keys sent by the card issuer management platform.

\* \* \* \* \*